United States Patent
Mills et al.

(10) Patent No.: US 7,646,572 B2
(45) Date of Patent: Jan. 12, 2010

(54) AIRCRAFT SYSTEM AND METHOD OF ARC FAULT PROTECTION FOR AN AIRCRAFT SYSTEM

(75) Inventors: Patrick W. Mills, Bradenton, FL (US); Kevin D. Gonyea, Bradenton, FL (US); Richard G. Benshoff, Sarasota, FL (US); James M. McCormick, Bradenton, FL (US)

(73) Assignee: Eaton Corporation, Cleveland, OH (US)

( * ) Notice: Subject to any disclaimer, the term of this patent is extended or adjusted under 35 U.S.C. 154(b) by 423 days.

(21) Appl. No.: 11/566,289

(22) Filed: Dec. 4, 2006

(65) Prior Publication Data

US 2008/0129112 A1 Jun. 5, 2008

(51) Int. Cl.
*H02H 3/00* (2006.01)
*H02H 9/08* (2006.01)

(52) U.S. Cl. ....................................................... 361/42
(58) Field of Classification Search ....................... 361/42
See application file for complete search history.

(56) References Cited

U.S. PATENT DOCUMENTS

| | | | |
|---|---|---|---|
| 5,224,006 A | 6/1993 | MacKenzie et al. | |
| 5,568,484 A * | 10/1996 | Margis | 370/452 |
| 5,691,869 A | 11/1997 | Engel et al. | |
| 6,052,046 A * | 4/2000 | Ennis et al. | 335/202 |
| 6,522,228 B2 | 2/2003 | Wellner et al. | |
| 6,522,509 B1 | 2/2003 | Engel et al. | |
| 6,542,056 B2 | 4/2003 | Nerstrom et al. | |
| 6,625,550 B1 * | 9/2003 | Scott et al. | 702/58 |
| 6,710,688 B2 | 3/2004 | Wellner et al. | |
| 6,727,441 B2 | 4/2004 | Benda | |
| 6,777,953 B2 * | 8/2004 | Blades | 324/532 |
| 6,903,289 B2 | 6/2005 | Tongo et al. | |
| 6,979,787 B2 | 12/2005 | Davies | |
| 7,126,445 B1 * | 10/2006 | McMahon et al. | 335/17 |
| 7,253,640 B2 * | 8/2007 | Engel et al. | 324/622 |
| 7,371,091 B2 * | 5/2008 | Kojori | 439/181 |
| 2004/0235469 A1 * | 11/2004 | Krug | 455/431 |

* cited by examiner

*Primary Examiner*—Fritz M. Fleming
*Assistant Examiner*—Lucy Thomas
(74) *Attorney, Agent, or Firm*—Bradley J. Diedrich

(57) ABSTRACT

A system is for an aircraft including a plurality of rows of seats. The system includes a plurality of monitors, a plurality of arc fault circuit interrupters each of which includes three poles having a line terminal and a load terminal. Each of a plurality of electronic enclosures is capable of being energized from a corresponding one of the load terminals of a corresponding one of the poles of a corresponding one of the AFCIs. A panel holds the AFCIs. A single-phase power source powers the line terminals of the poles of the AFCIs. Each of the poles corresponds to one row of the aircraft. Each of the electronic enclosures corresponds to one of a plurality of zones. Three of the rows are disposed in each of the zones. One of the AFCIs is associated with a corresponding one of the zones.

19 Claims, 4 Drawing Sheets

AIRCRAFT SYSTEM AND METHOD OF ARC FAULT PROTECTION FOR AN AIRCRAFT SYSTEM

BACKGROUND OF THE INVENTION

1. Field of the Invention

This invention pertains generally to aircraft systems and, more particularly, to aircraft systems including arc fault protection. The invention also pertains to a method of arc fault protection for an aircraft system.

2. Background Information

It is known to employ thermal fuses between an avionics power source and the seat electronics boxes of an aircraft entertainment system, with one thermal fuse per corresponding seat electronics box. While this thermal fuse arrangement can deal with overcurrent conditions, it cannot respond to arc faults (e.g., line-to-line; line-to-frame).

During sporadic arc fault conditions, the overload capability of a circuit breaker will not function since the root-mean-squared (RMS) value of the fault current is too small to actuate the automatic trip circuit. The addition of electronic arc fault sensing to a circuit breaker can add one of the elements required for sputtering arc fault protection—ideally, the output of an electronic arc fault sensing circuit directly trips and, thus, opens the circuit breaker. See, for example, U.S. Pat. Nos. 6,710,688; 6,542,056; 6,522,509; 6,522,228; 5,691,869; and 5,224,006.

Aircraft circuit breakers have employed various mechanisms to indicate arc fault events. For example, U.S. Pat. No. 6,542,056 discloses a movable and illuminable arc fault indicator having a ring portion and two leg portions internal to a housing. When energized by an arc fault current assembly in response to an arc fault trip condition, an arc fault actuator moves one of the leg portions internal to the housing, which, in turn, moves the ring portion external to the housing. The arc fault current assembly includes a light emitting diode (LED) for illuminating the ring portion through the other one of the leg portions when the arc fault current assembly is properly powered and in the absence of an arc fault trip condition.

Application Ser. No. 11/129,909 discloses an arc fault circuit breaker including a first LED for a first status (e.g., an arc fault trip status) and a second LED for a second status (e.g., a health status). The first LED illuminates a transparent operating handle. The second LED protrudes through the circuit breaker housing and through a device key-hole in a panel.

There is room for improvement in aircraft systems.

There is also room for improvement in methods of arc fault protection for an aircraft system.

SUMMARY OF THE INVENTION

These needs and others are met by embodiments of the invention, which power a system for an aircraft employing a number of plural-pole arc fault circuit interrupters and a plurality of electronic enclosures. Each of the electronic enclosures is capable of being energized from a corresponding load terminal of a corresponding one of the poles of a corresponding one of the number of arc fault circuit interrupters. The line terminals of the poles of the number of arc fault circuit interrupters are powered from a single-phase power source. Each of the poles is associated with a number of the rows of the aircraft. Each of the electronic enclosures is associated with one of a plurality of zones. A plurality of rows of the aircraft are disposed in each of the zones. One of the number of arc fault circuit interrupters is associated with a corresponding one of the zones.

In accordance with one aspect of the invention, a system for an aircraft including a plurality of rows of seats comprises: a plurality of loads; a number of arc fault circuit interrupters, each of the number of arc fault circuit interrupters comprising a plurality of poles, each of the poles comprising a line terminal and a load terminal; a plurality of electronic enclosures, each of the electronic enclosures being capable of being energized from a corresponding one of the load terminals of a corresponding one of the poles of a corresponding one of the number of arc fault circuit interrupters; a panel holding the number of arc fault circuit interrupters; and a single-phase power source powering the line terminals of the poles of the number of arc fault circuit interrupters, wherein each of the poles corresponds to a number of the rows of the aircraft, wherein each of the electronic enclosures corresponds to one of a plurality of zones, wherein a plurality of the rows are disposed in each of the zones, and wherein one of the number of arc fault circuit interrupters is associated with a corresponding one of the zones.

Each of the electronic enclosures may receive a single-phase alternating current voltage from a corresponding one of the poles of a corresponding one of the arc fault circuit interrupters and output a direct current voltage to a corresponding plurality of the loads.

The aircraft may include an aft cargo bay, the single-phase power source may be an avionics power source, and the panel may be positioned in the aft cargo bay and the line terminals of the poles of the number of arc fault circuit interrupters are powered from the avionics power source. Each of the electronic enclosures may be energized through a conductor from a corresponding one of the load terminals of a corresponding one of the poles of a corresponding one of the number of arc fault circuit interrupters, and the panel may be proximate the avionics power source, in order to protect all of the conductors from the aft cargo bay to the electronic enclosures.

The number of arc fault circuit interrupters may be structured to protect all of the conductors from phase-to-phase arc faults and phase-to-frame arc faults within each of the zones.

The panel may include a ground and the avionics power source may include the same ground.

The arc fault circuit interrupters may be structured to permit a corresponding one of the electronic enclosures to be hot-swapped when a corresponding one of the electronic enclosures is energized from a corresponding one of the load terminals of a corresponding one of the poles of a corresponding one of the number of arc fault circuit interrupters.

The arc fault circuit interrupters may comprise an arc fault detection circuit structured to permit the corresponding one of the electronic enclosures to be hot-swapped.

Each of the arc fault circuit interrupters may comprise a frame terminal and an indicator for each of the poles thereof. The indicator may be structured to indicate when the corresponding one of the arc fault circuit interrupters is properly installed and properly powered from the line terminals and the frame terminal thereof.

Each of the arc fault circuit interrupters may comprise three poles and three indicators for the poles thereof. The three indicators may provide functionality verification for three of the rows of a corresponding one of the zones.

As another aspect of the invention, a method of powering a system for an aircraft including a plurality of rows of seats comprises: employing a plurality of loads; employing a number of arc fault circuit interrupters, each of the number of arc fault circuit interrupters comprising a plurality of poles, each of the poles comprising a line terminal and a load terminal; employing a plurality of electronic enclosures, each of the electronic enclosures being capable of being energized from a corresponding one of the load terminals of a corresponding one of the poles of a corresponding one of the number of arc fault circuit interrupters; powering the line terminals of the poles of the number of arc fault circuit interrupters from a single-phase power source; associating each of the poles with a number of the rows of the aircraft; associating each of the electronic enclosures with one of a plurality of zones; disposing a plurality of the rows in each of the zones, and associating one of the number of arc fault circuit interrupters with a corresponding one of the zones.

The method may energize one of the electronic enclosures from a corresponding one of the load terminals of a corresponding one of the poles of a corresponding one of the number of arc fault circuit interrupters; and may permit the one of the electronic enclosures to be hot-swapped without tripping the corresponding one of the number of arc fault circuit interrupters.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

The invention is disclosed in association with an in-flight entertainment system for an aircraft, although the invention is applicable to a wide range of aircraft systems (e.g., without limitation, various aircraft loads such as, for example, fans, pumps and motors).

Figure 1:
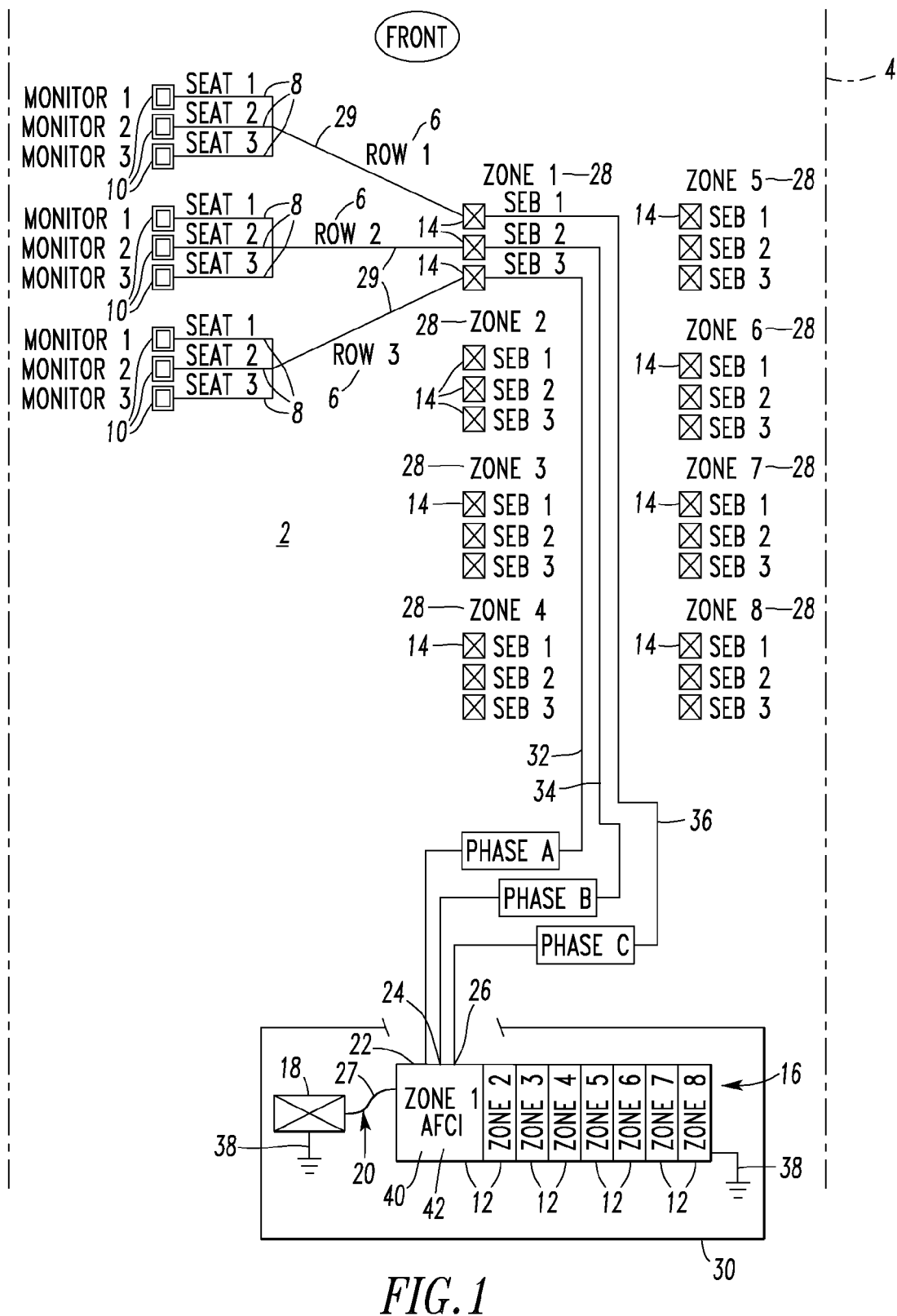
FIG. 1 a block diagram of a power distribution system for an aircraft entertainment system showing the isolation of various zones in accordance with an embodiment of the invention.

Referring to FIG. 1, an aircraft system 2 (e.g., without limitation, an in-flight entertainment system) is for an aircraft 4 (shown in phantom line drawing) including a plurality of rows 6 of seats 8. The system 2 includes a plurality of loads 10 (e.g., without limitation, monitors), one or more plural-pole arc fault circuit interrupters (AFCIs) 12 and a plurality of electronic enclosures 14 (e.g., without limitation, under seat electronics boxes (SEBs)). A panel 16 holds the AFCIs 12. A single-phase power source 18 powers the line terminals 50,52,54 (not shown in FIG. 1; shown in FIG. 4) of the plural poles (phase A, phase B, phase C) of the AFCIs 12 through conductor 20 (which may be several parallel conductors). As shown in FIG. 1, the AFCI 12 for zone 1 has three poles, with each of the poles including one of the line terminals 50,52,54 (shown in FIG. 4) and one of the load terminals 22,24,26. For example, phase A includes the line terminal 50 and the load terminal 22. Each of the electronic enclosures 14 is capable of being energized from a corresponding one of the load terminals of a corresponding one of the poles of a corresponding one of the AFCIs 12. For example, the electronic enclosure 14 (e.g., SEB 1 of zone 1) is capable of being energized from the load terminal 22 of the phase A pole of the zone 1 AFCI 12.

Although the three example poles are shown as phase A, phase B and phase C in FIG. 1, two, three or more poles may be employed and each of such poles is powered from one and the same single-phase power source, such as 18.

EXAMPLE 1

Each of the AFCI poles corresponds to one or more of the aircraft rows 6 (e.g., one row 6 per pole is shown in FIG. 1). Each of the electronic enclosures 14 corresponds to one of a plurality of zones 28, such as zone 1 or zone 2. For example, there are three electronic enclosures 14 for each of the zones 28. A plurality (e.g., without limitation, three) of the rows 6 are disposed in each of the zones 28. One of the AFCIs 12 is associated with a corresponding one of the zones 28. In the example of FIG. 1, there are eight AFCIs 12 and eight corresponding zones 28. Also, in this example, there are three seats 8 per each of the rows 6, and there are nine loads 10 per each of the zones 28.

In the example of FIG. 1, there are a total of 24 electronic enclosures 14 each of which is associated with a corresponding one of the rows 6 and which is structured to power three of the loads 10. All of the example 24 electronic enclosures 14 receive the same single-phase alternating current voltage 27 (e.g., without limitation, 115 VAC, 400 Hz) from a corresponding one of the poles of a corresponding one of the AFCIs 12 and output a direct current voltage 29 (e.g., without limitation, 15 VDC) to a corresponding plurality (e.g., without limitation, three) of the loads 10.

The AFCI panel 16 is positioned, for example, in the aft cargo bay 30 of the aircraft 4 (e.g., without limitation, Airbus® A320®; Boeing®737; Embraer®). The three-pole AFCIs 12 of the panel 16 (e.g., without limitation, 24 total poles in this example) are powered, for example, from the same single-phase power source 18 (e.g., without limitation, LiveTV® avionics power source).

Each of the electronic enclosures 14 is energized through a corresponding conductor, such as 32,34,36, from a corresponding one of the load terminals 22,24,26, respectively, of a corresponding one of the poles of a corresponding one of the AFCIs 12, such as is shown with the zone 1 AFCI 12. It will be appreciated that the electrical connections from the seven other ACFIs 12 to the seven other zones 28 are made in a like manner. Preferably, the AFCI panel 16 is positioned as close as possible (e.g., without limitation, less than about 36 inches) to the single-phase power source 18, in order to protect all of the conductors 32,34,36 of each of the zones 28 from the aft cargo bay 30 to the individual electronic enclosures 14.

The AFCI panel 16 includes a ground 38 (i.e., the aircraft frame) and the single-phase power source 18 includes the same ground 38 (i.e., the aircraft frame). The example three-pole AFCIs 12 are structured to protect all of the conductors 32,34,36 from phase-to-phase arc faults and from phase-to-frame arc faults within each of the zones 28. The disclosed three-pole AFCIs 12 protect corresponding zones 28 in the aircraft 4 rather than employing individual single-pole circuit breakers for the various rows 6 or seats 8. If an arc fault occurs on any of the power conductors 32,34,36 of any of the phases A,B,C within any of the zones 28, then the entire zone is de-energized. This improves overall system safety by protecting the corresponding loads 14 and the conductors 32,34,36.

For example, phase-to-phase and phase-to-frame arc faults are detected within each of the zones 28. This would not be possible with a thermal fuse.

EXAMPLE 2

Although AFCIs 12 are employed, the disclosed AFCIs may provide, in addition to arc fault protection, ground fault equipment protection.

EXAMPLE 3

A problem may exist if a failed or suspect seat electronics box 14 is "hot-swapped" (e.g., removed and reinserted; removed and replaced; its power cable (not shown) is removed and reinserted; disconnected and replaced) while being energized. This may cause a significant startup current transient that causes the corresponding AFCI 12 to trip. The solution is to increase the capacitance of the AFCI integration capacitor 40 of the AFCI 12 by about 100% (i.e., doubling the capacitance), in order to ride out the transient until the startup current transient settles out. This change desensitizes the corresponding arc fault detection circuit 42, requiring it to accumulate twice as much activity before reaching the trip threshold (i.e., providing a slower trip time response). As such, the example AFCIs 12 are preferably structured to permit a corresponding one of the electronic enclosures 14 to be hot-swapped when it is energized from a corresponding one of the load terminals 22,24,26 of a corresponding one of the poles of a corresponding one of the AFCIs 12.

EXAMPLE 4

Figure 2:
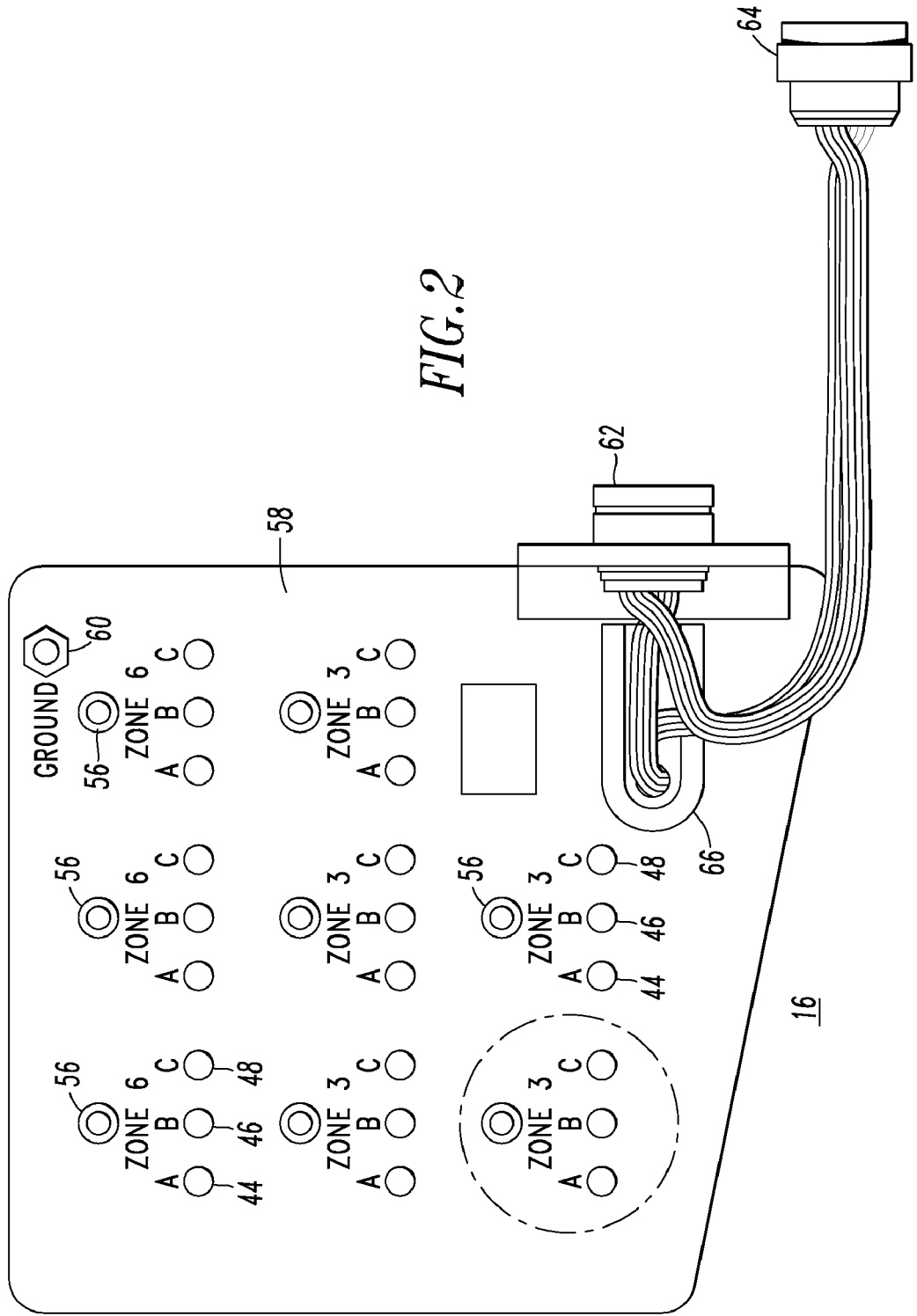
FIG. 2 is a front elevation view of the arc fault circuit breaker panel of FIG. 1.
Figure 3:
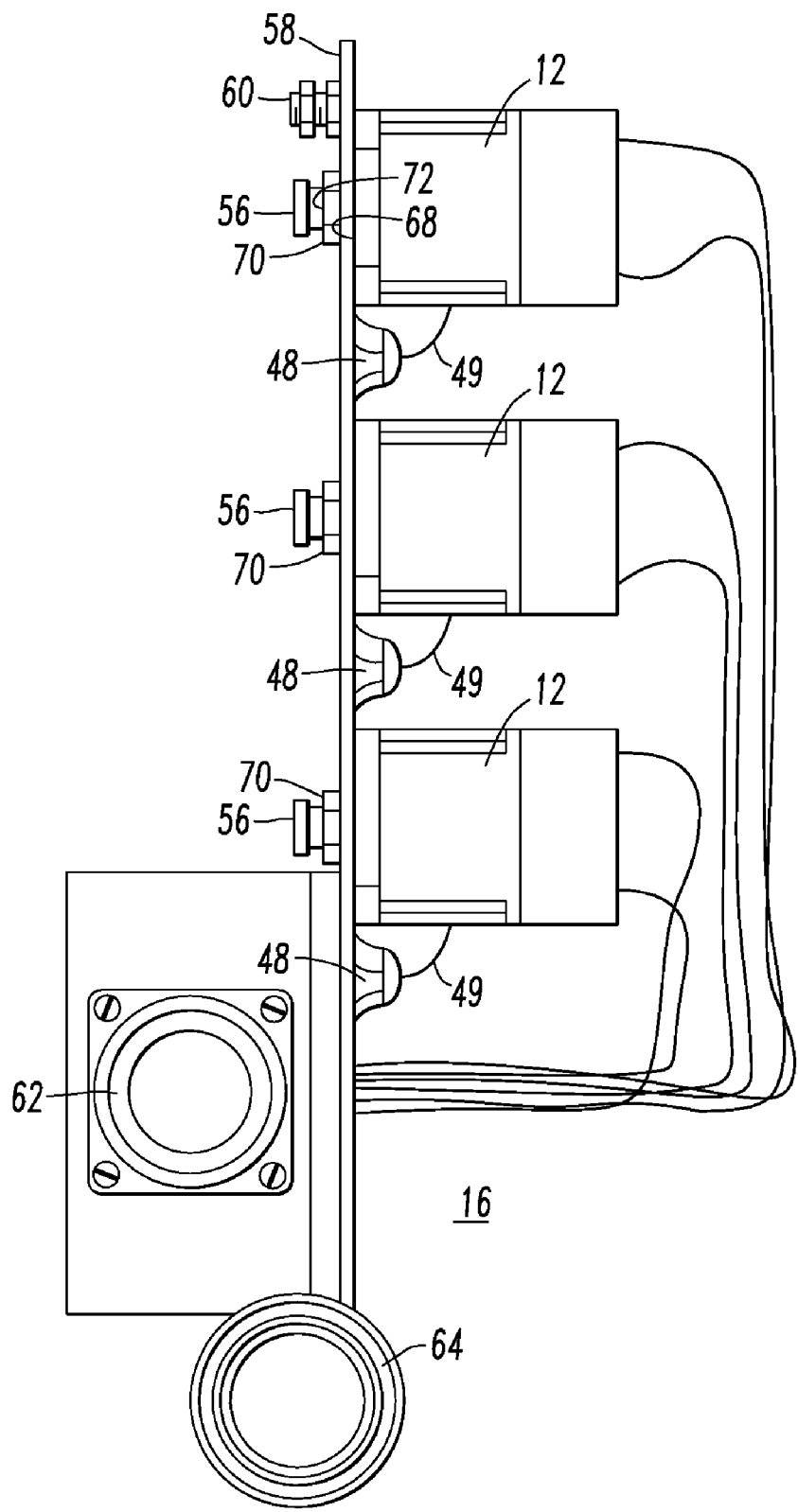
FIG. 3 is a side elevation view of the arc fault circuit breaker panel of FIG. 1.
Figure 4:
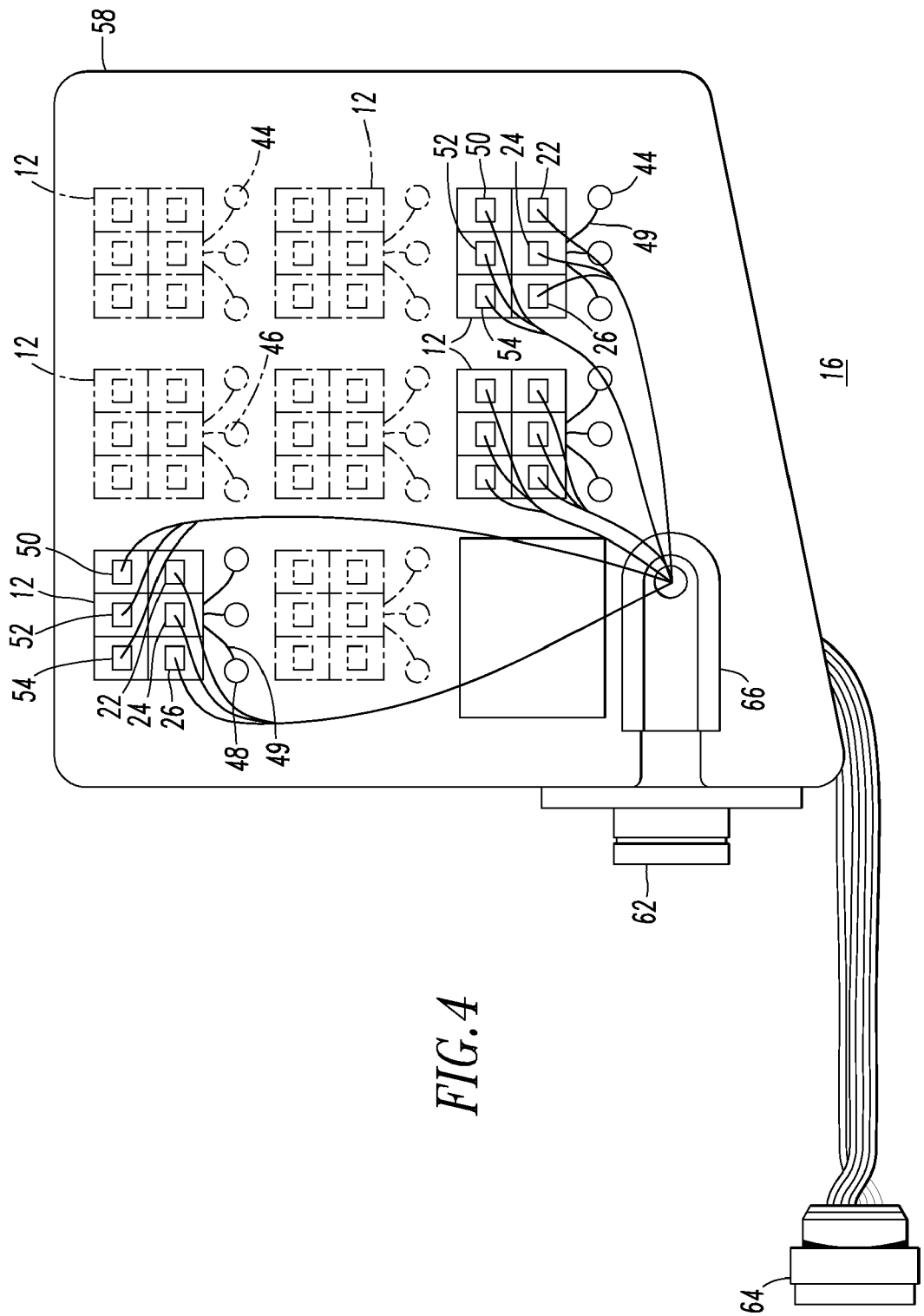
FIG. 4 is a rear elevation view of the arc fault circuit breaker panel of FIG. 1.

FIGS. 2-4 show the AFCI panel 16 of FIG. 1. The AFCI 12 of FIG. 1 combines thermal circuit protection (e.g., without limitation, 3 A, three-phase) with a suitable electronic arc fault detection circuit 42 for sensing and responding to arc faults. Each of the example three-pole AFCIs 12 includes three LEDs 44,46,48 that are illuminated when the AFCI 12 is properly installed, properly energized through the conductor 20 and properly grounded to the aircraft frame at 38. The LEDs 44,46,48 are electrically connected to conductors 49 from the arc fault detection circuit 42. The LEDs 44,46,48 serve multiple functions. When the AFCI 12 is properly installed, energized and grounded, the LEDs 44,46,48 are illuminated. The AFCI 12 is a polarized device that allows the LEDs 44,46,48 to be used for verifying the proper orientation of the line terminals 50,52,54 and load terminals 22,24,26. If the LEDs 44,46,48 are illuminated, then the operating handle (e.g., button) 56 of the AFCI 12 can be opened/actuated. If any or all of the LEDs 44,46,48 remain illuminated, then the polarity of the AFCI 12 is reversed for the corresponding phase(s). The LEDs 44,46,48 can also be used for continuously monitoring portions of the AFCI 12. The LEDs 44,46, 48 remain illuminated to indicate that the line conductor 20 is powered. Additionally, they indicate proper ground, the powered status of the arc fault detection circuit 42, and the continuity of the internal AFCI actuation trip coil (not shown). The three health LEDs 44,46,48 of each AFCI 12, thus, provide functionality verification for its three poles and, hence, for the three rows 6 of a corresponding one of the zones 28.

As shown in FIG. 2, the AFCI panel 16 includes a front conductive surface 58 and a panel ground 60, which is electrically connected to the aircraft frame 38 (FIG. 1). The AFCI panel 16 holds eight of the AFCIs 12 as shown in FIG. 4 with the operating handle 56 and the LEDs 44,46,48 protruding through openings in the surface 58 as shown in FIG. 2. The AFCI panel 16 includes a connector 62 for receiving the conductor 20 of FIG. 1 and electrically connecting that conductor to each of the example 24 (=3 line terminals 50,52, 54×8 AFCIs 12) line terminals 50,52,54. The AFCI panel 16 also includes a connector 64 for receiving the 24 (=3 load terminals 22,24,26×8 AFCIs 12) conductors 32,34,36 of FIG. 1 and electrically connecting those conductors to each of the example 24 (=3 load terminals 22,24,26×8 AFCIs 12) load terminals 22,24,26. A chafe guard 66 protects the electrical conductors from the connectors 62,64 to the AFCI line terminals 50,52,54 and load terminals 22,24,26, as shown in FIG. 4.

The AFCI top plate 68, as shown with one of the AFCIs 12 of FIG. 3, is electrically connected through a fastener 70 at a frame terminal 72 (e.g., bezel) to the conductive grounded surface 58 of the AFCI panel 16.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A system for an aircraft including a plurality of rows of seats, said system comprising:
   a plurality of loads;
   a number of arc fault circuit interrupters, each of said number of arc fault circuit interrupters comprising a plurality of poles, each of said poles comprising a line terminal and a load terminal;
   a plurality of electronic enclosures, each of said electronic enclosures being capable of being energized from a corresponding one of the load terminals of a corresponding one of the poles of a corresponding one of said number of arc fault circuit interrupters;
   a panel holding said number of arc fault circuit interrupters; and
   a single-phase power source powering the line terminals of the poles of said number of arc fault circuit interrupters,
   wherein each of said poles corresponds to a number of said rows of said aircraft,
   wherein each of said electronic enclosures corresponds to one of a plurality of zones,
   wherein a plurality of said rows are disposed in each of said zones,
   wherein one of said number of arc fault circuit interrupters is associated with a corresponding one of said zones,
   wherein said number of arc fault circuit interrupters are structured to permit a corresponding one of said electronic enclosures to be hot-swapped when a corresponding one of said electronic enclosures is energized from a corresponding one of the load terminals of a corresponding one of the poles of a corresponding one of said number of arc fault circuit interrupters, and
   wherein said number of arc fault circuit interrupters comprise an arc fault detection circuit structured to permit the corresponding one of said electronic enclosures to be hot-swapped.

2. The system of claim 1 wherein said system is an entertainment system; and wherein at least some of said loads include a corresponding number of monitors.

3. The system of claim 1 wherein said zones include eight zones; wherein said rows include three rows per each of said zones; wherein said seats include three seats per each of said rows; and wherein said loads include nine monitors per each of said zones.

4. The system of claim 3 wherein said plurality of electronic enclosures are 24 under seat electronics boxes, each of said under seat electronics boxes being associated with a corresponding one of said rows, and being structured to power three of said monitors.

5. The system of claim 1 wherein each of said electronic enclosures receives a single-phase alternating current voltage from a corresponding one of said poles of a corresponding one of said arc fault circuit interrupters and outputs a direct current voltage to a corresponding plurality of said loads.

6. The system of claim 1 wherein said aircraft includes an aft cargo bay; wherein said single-phase power source is an avionics power source; and wherein said panel is positioned in said aft cargo bay and the line terminals of the poles of said number of arc fault circuit interrupters are powered from said avionics power source.

7. The system of claim 6 wherein each of said electronic enclosures is energized through a conductor from a corresponding one of the load terminals of a corresponding one of the poles of a corresponding one of said number of arc fault circuit interrupters; and wherein said panel is proximate said avionics power source, in order to protect all of said conductors from said aft cargo bay to said electronic enclosures.

8. The system of claim 7 wherein said number of arc fault circuit interrupters is structured to protect all of said conductors from phase-to-phase arc faults and phase-to-frame arc faults within each of said zones.

9. The system of claim 6 wherein said panel includes a ground; and wherein said avionics power source includes the same ground.

10. The system of claim 1 wherein each of said arc fault circuit interrupters comprises a frame terminal and an indicator for each of the poles thereof; and wherein said indicator is structured to indicate when the corresponding one of said arc fault circuit interrupters is properly installed and properly powered from the line terminals and the frame terminal thereof.

11. The system of claim 1 wherein each of said arc fault circuit interrupters comprises three poles and three indicators for the poles thereof; and wherein said three indicators provide functionality verification for three of the rows of a corresponding one of said zones.

12. A method of powering a system for an aircraft including a plurality of rows of seats, said method comprising:
employing a plurality of loads;
employing a number of arc fault circuit interrupters, each of said number of arc fault circuit interrupters comprising a plurality of poles, each of said poles comprising a line terminal and a load terminal;
employing a plurality of electronic enclosures, each of said electronic enclosures being capable of being energized from a corresponding one of the load terminals of a corresponding one of the poles of a corresponding one of said number of arc fault circuit interrupters;
powering the line terminals of the poles of said number of arc fault circuit interrupters from a single-phase power source;
associating each of said poles with a number of said rows of said aircraft;
associating each of said electronic enclosures with one of a plurality of zones;
disposing a plurality of said rows in each of said zones;
associating one of said number of arc fault circuit interrupters with a corresponding one of said zones;
structuring said number of arc fault circuit interrupters to permit a corresponding one of said electronic enclosures to be hot-swapped when a corresponding one of said electronic enclosures is energized from a corresponding one of the load terminals of a corresponding one of the poles of a corresponding one of said number of arc fault circuit interrupters; and
including with said number of arc fault circuit interrupters an arc fault detection circuit structured to permit the corresponding one of said electronic enclosures to be hot-swapped.

13. The method of claim 12 further comprising
employing as said number of arc fault circuit interrupters a plurality of arc fault circuit interrupters.

14. The method of claim 12 further comprising
employing as said loads a corresponding number of monitors.

15. The method of claim 14 further comprising
employing 24 of said electronic enclosures, each of said electronic enclosures being disposed for a corresponding one of said rows, and being structured to power three of said monitors.

16. The method of claim 12 further comprising
receiving at each of said electronic enclosures a single-phase alternating current voltage from a corresponding one of said poles of a corresponding one of said arc fault circuit interrupters; and
outputting a direct current voltage from each of said electronic enclosures to a corresponding plurality of said loads.

17. The method of claim 12 further comprising
energizing each of said electronic enclosures through a conductor from a corresponding one of the load terminals of a corresponding one of the poles of a corresponding one of said number of arc fault circuit interrupters; and
protecting all of said conductors from phase-to-phase arc faults and phase-to-frame arc faults within each of said zones.

18. The method of claim 12 further comprising
energizing one of said electronic enclosures from a corresponding one of the load terminals of a corresponding one of the poles of a corresponding one of said number of arc fault circuit interrupters; and
permitting said one of said electronic enclosures to be hot-swapped without tripping the corresponding one of said number of arc fault circuit interrupters.

19. A method of powering a system for an aircraft including a plurality of rows of seats, said method comprising:
employing a plurality of loads;
employing a number of arc fault circuit interrupters, each of said number of arc fault circuit interrupters comprising a plurality of poles, each of said poles comprising a line terminal and a load terminal;
employing a plurality of electronic enclosures, each of said electronic enclosures being capable of being energized from a corresponding one of the load terminals of a corresponding one of the poles of a corresponding one of said number of arc fault circuit interrupters;
powering the line terminals of the poles of said number of arc fault circuit interrupters from a single-phase power source;
associating each of said poles with a number of said rows of said aircraft;
associating each of said electronic enclosures with one of a plurality of zones;
disposing a plurality of said rows in each of said zones;

associating one of said number of arc fault circuit interrupters with a corresponding one of said zones;

employing a number of said number of arc fault circuit interrupters comprising an arc fault detection circuit including an integration capacitor; and increasing the capacitance of said integration capacitor by about 100%, in order to permit the corresponding one of said electronic enclosures to be hot-swapped.

* * * * *